April 30, 1957     D. E. CAIN     2,790,409
QUICK DISCONNECT JOINT FOR TORPEDOES
Filed Sept. 11, 1953
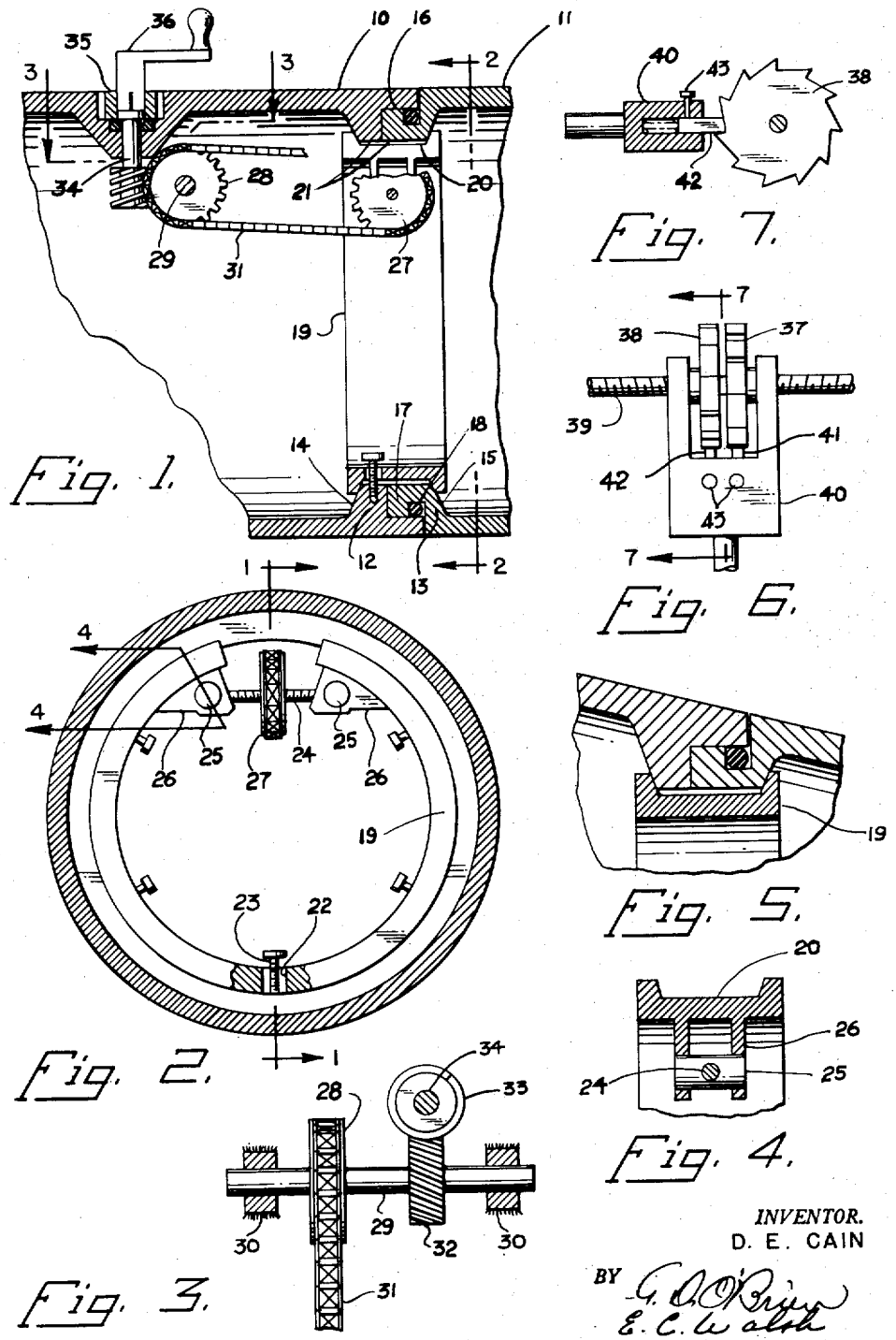
INVENTOR.
D. E. CAIN
BY
ATTORNEYS United States Patent Office 2,790,409
Patented Apr. 30, 1957

2,790,409

QUICK DISCONNECT JOINT FOR TORPEDOES

Dallas E. Cain, Scotia, N. Y., assignor, by mesne assignments, to the United States of America as represented by the Secretary of the Navy Application September 11, 1953, Serial No. 380,887

5 Claims. (Cl. 114—22)

The present invention relates to a coupling and has for its primary object the provision of a quick disconnect joint between two torpedo body sections.

Torpedo bodies are ordinarily constructed in several sections in order to facilitate the installation of parts within the torpedo body or to effect various adjustments of the torpedo propulsion and control systems. Various means have been employed in the past for releasably securing the several sections together into an integral unit, but such prior securing means have either been too complex in construction, not easily accessible, or time-consuming in operation. Further, many of these prior connecting arrangements required that interruptions be made in the external contour of the torpedo shell with the result that the most efficient streamlining of the torpedo shell was impossible to realize.

The present invention avoids the disadvantages associated with the prior art means of joining torpedo sections by providing a coupling assembly which is rapid in operation, easily accessible, and requires no interruption of the external surface of the torpedo casing.

In accordance with the foregoing, an object of the present invention is to provide a quickly operable coupling for joining sections of a torpedo body together.

Another object of the present invention is to provide coupling means for joining the sections of a torpedo body together which coupling means is easily accessible, rapid in its operation, and requires no interruption in the streamlined contour of the torpedo casing.

A further object is the provision of means for joining the sections of a torpedo body together which means comprises an internal clamping ring which may be expanded and contracted between coupling and uncoupling positions by means accessible from the outside of the torpedo body and which results in a minimum of interference with the streamline profile of the torpedo casing.

Other objects and many of the attendant advantages of the present invention will become apparent as the same becomes better understood from the following detailed description had in conjunction with the annexed drawings wherein:

Fig. 1 is a partial longitudinal sectional view of a torpedo casing illustrating one form of the coupling means of the present invention securing two adjacent sections of the casing together, parts being broken away for the sake of clarity;

Fig. 2 is a transverse sectional view taken substantially along the line 2—2 of Fig. 1;

Fig. 3 is a partial sectional view taken substantially along line 3—3 of Fig. 1;

Fig. 4 is a partial sectional view taken along the line 4—4 of Fig. 2;

Fig. 5 shows the internal clamping ring of the present invention joining two tapering sections of a torpedo body;

Fig. 6 illustrates a modified means for actuating the clamping ring of the present invention; and Fig. 7 is a sectional view taken substantially along the line 7—7 of Fig. 6.

Referring now to the drawings and more particularly to Fig. 1 wherein there is illustrated a torpedo body portion comprising two separately formed sections 10 and 11 which are cylindrical in cross section and have formed therein inwardly extending annular flanges 12 and 13, respectively, at the adjacent ends of the sections. Each of the flanges 12 and 13 has its longitudinally inward face inclined to the axis of the torpedo body whereby to form substantially frusto-conical surfaces 14 and 15, respectively. Annular flange 12 is spaced longitudinally inward of the end of section 10 thereby forming an annular seat 16 at the end of section 10 for receiving an annular projection 17 formed on annular flange 13. An annular recess is provided in projection 17, as shown, for receiving an O-ring 18 whereby to provide a fluid-tight seal between torpedo body sections 10 and 11. One form of the coupling means of the present invention comprises a resilient clamping ring 19 which, as shown in Fig. 2, is substantially circular in shape and has a section thereof cut away whereby to permit expansion and contraction thereof by means to be presently described. The outer surface of the ring 19 is provided with a circumferentially extending channel 20 having sloping sides, whereby to provide a substantially V-shaped channel, for receiving the abutting annular flanges on sections 10 and 11 of the torpedo body with the sloping sides of the channel engaging the frustoconical surfaces of the annular flanges whereby when said ring is expanded radially outward by the means hereinafter described, the torpedo body sections 10 and 11 will be securely clamped together by the wedging action of the channel sidewalls on the frustoconical surfaces of the annular flanges. As shown, the bottom of the circumferentially extending channel in clamp ring 19 is spaced somewhat from the inner surfaces 21 of the annular flanges to permit the clamp ring 19 to expand into tight wedging engagement with the flanges. Ring 19 is provided around its circumference with a plurality of spaced openings 22 for receiving a plurality of headed members 23 each having a body portion substantially smaller in diameter than the openings 22 and a head portion substantially larger than openings 22, the members being threadedly secured in annular flange 12 with the under surface of their heads spaced equally from the inner surface of the ring 19 whereby to permit inward contraction of the ring and are for a purpose hereinafter described. The means for expanding and contracting ring 19, whereby to permit quick coupling and uncoupling of the torpedo body sections 10 and 11, comprises, in the modification of Fig. 1, a threaded rod 24 which is threadedly engaged in openings formed in cylindrical nut members 25, the latter being rotatably mounted at their opposite ends within openings formed in spaced supports 26 projecting radially inward from the inner surface of ring 19 (see Fig. 4). Rigidly secured to threaded rod 24 at its center is a sprocket 27, the threads formed in the rod 24 on one side of said sprocket being right-hand threads and the threads on the other side of said sprocket being left-hand threads whereby the free end portions of ring 19 will either be drawn toward each other, so as to contract the ring, or move away from each other, so as to expand the ring, depending upon the direction of rotation of sprocket 27. The pivotal mounting of nuts 25 in supports 26 permits such expansion and contraction of ring 19 without binding of the threaded connections. In driving engagement with sprocket 27 and a sprocket 28, fixed to a shaft 29 journaled within bearings 30 (Fig. 3) on torpedo body section 10, is a drive chain 31. Mounted on shaft 29 for rotation therewith is a worm wheel 32 having its teeth in meshing engagement with a worm gear 33 formed on a shaft 34 which is rotatably mounted within an opening formed in the wall of torpedo body section 10. Secured to the outer end of shaft 34, and positioned within a recess formed in the outer surface of body section 10, is a socket member 35 adapted to removably receive a crank member 36.

The operation of the present invention will be apparent from the foregoing description. Thus, to effect coupling or uncoupling of torpedo sections 10 and 11, crank 36 is inserted in socket portion 35, and upon rotation thereof, sprocket 27 will be rotated to move expansion ring 19 to either its expanded or contracted position, depending upon the direction of rotation of crank 36, whereby to either couple or uncouple the torpedo body sections. Members 23 serve to limit the inward contraction of clamp ring 19 and further act to maintain clamp ring 19 in concentric relationship with the torpedo body section 10 in the contracted position thereof whereby to facilitate telescoping of body section 11 over clamp ring 19 into and out of position in seat 16.

Referring now to Figs. 6 and 7 there is illustrated a modified form of clamp ring actuating means comprising a pair of oppositely directed ratchet wheels 37 and 38 secured to the center of a threaded rod 39, similar to threaded rod 24, which is adapted to have its opposite ends threadedly engaged within the threaded openings in cylindrical nut members 25 in a manner similar to threaded shaft 24. Mounted for oscillatory motion on shaft 39 is a ratchet handle 40 having mounted therein a pair of oppositely acting spring biased ratchet pawls 41 and 42 which are, in the well known manner, adapted to be selectively disposed in operative engagement with one or the other of ratchet wheels 37 and 38, such as by withdrawing one or the other out of engagement with its associated ratchet wheel and locking it by a set screw 43, the arrangement being such that expansion or contraction of clamp ring 19 may be effected by oscillating movement of ratchet handle 40. Access to handle 40 for operation thereof may be provided by an opening, not shown, formed in the torpedo body section 10 which opening may be provided with a removable fluid-tight cover having its outer surface conforming to the outer surface of the torpedo body whereby to create no interruption in the streamlined contour of the torpedo body.

In Fig. 5 there is illustrated one manner of forming the flanges on the torpedo sections in the event that it is necessary to join two tapering body sections.

It is obvious that many modifications of the present invention are possible in the light of the above teachings. It is, therefore, to be understood that within the scope of the appended claims the present invention may be practiced otherwise than as specifically described herein.

What is claimed is:

1. A torpedo shell comprising a pair of adjacent circular hollow body sections, one section having a cylindrical bore at one end thereof and an annular internal flange disposed inwardly from said end, an annular internal flange at the end of the other section having an outside diameter substantially the same as said bore whereby the bore telescopically receives the second named flange, the remote faces of said flanges being annular and tapering inwardly toward each other such that a longitudinal cross section through the flanges is substantially frusto-conical, a split expansion ring having an outwardly open channel therein, the facing sides of the channel tapering outwardly and corresponding in shape to said remote faces, adapted to engage said faces and draw said flanges toward each other upon outward expansion of said ring, means movably supporting said ring on one of said sections adapted to permit the ring to be contracted to a size such that the sections may be separated by relative axial movement, means extending between the ends of the ring for selectively expanding or contracting same, and means for preventing leakage of water in a direction from outside the shell to the inside thereof through the joint formed by said bore and flanges.

2. Apparatus in accordance with claim 1, said means extending between the ends of the ring comprises a rotatable rod having right hand threads at one end and left hand threads at the other end.

3. Apparatus in accordance with claim 2 including rotatable means accessible from outside of the shell, and mechanism connecting the means aforesaid and the rotatable rod, whereby the rotatable rod may be rotated from outside the shell.

4. Apparatus in accordance with claim 2 including a ratchet device carried by the rod for rotating it in either direction.

5. A torpedo shell comprising a pair of adjacent circular hollow body sections, one section having a cylindrical bore at one end thereof and an annular internal flange disposed inwardly from said end, the side of said flange facing toward said end being annular and substantially perpendicular to the axis of the bore and forming a bottom for said bore, an annular internal flange at the end of the other section having an outside diameter substantially the same as said bore whereby the bore telescopically receives the second named flange, the end face of the flange adapted to abut said bottom for said bore, said second section having an annular surface disposed substantially perpendicular to said bore for substantially abutting a like surface at the outer end of the first section, whereby a generally Z-shaped zone of juncture is provided between said sections, formed by a cylindrical surface and annular surfaces at opposite ends of the cylindrical surface and extending in opposite directions therefrom, the remote faces of said flanges being annular and tapering inwardly toward each other such that a longitudinal cross section through the flanges is substantially frusto-conical, a split expansion ring having an outwardly open channel therein, the facing sides of the channel tapering outwardly and corresponding in shape to said remote faces, adapted to engage said faces and draw said flanges toward each other upon outward expansion of said ring until the end surface of said other section abuts said bottom for said bore, and means extending between ends of said ring for selectively expanding or contracting same.

References Cited in the file of this patent
UNITED STATES PATENTS

| | | |
|---|---|---|
| 115,906 | Stine | June 13, 1871 |
| 831,551 | Guttzeit | Sept. 25, 1906 |
| 1,516,998 | Curry et al. | Nov. 25, 1924 |
| 1,733,549 | Miller | Oct. 29, 1929 |
| 2,353,572 | Kuster | July 11, 1944 |
| 2,580,396 | Bluth | Jan. 1, 1952 |
| 2,650,115 | Taylor | Aug. 25, 1953 |